US012717638B2

(12) United States Patent
Ramirez Flores et al.

(10) Patent No.: US 12,717,638 B2
(45) Date of Patent: Aug. 25, 2026

(54) LOAD MANAGEMENT SYSTEM FOR DEVICE TO OPTIMIZE USER EXPERIENCE

(71) Applicant: Lenovo (Singapore) Pte. Ltd., Singapore (SG)

(72) Inventors: Axel Ramirez Flores, Cary, NC (US); Rod D Waltermann, Rougemont, NC (US); George O Diatzikis, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 692 days.

(21) Appl. No.: 18/141,119

(22) Filed: Apr. 28, 2023

(65) Prior Publication Data

US 2024/0362073 A1 Oct. 31, 2024

(51) Int. Cl.
*G06F 9/50* (2006.01)
*G06F 11/34* (2006.01)

(52) U.S. Cl.
CPC .......... *G06F 9/505* (2013.01); *G06F 11/3409* (2013.01)

(58) Field of Classification Search
CPC ... G06F 9/505; G06F 11/3409; G06F 11/3438
See application file for complete search history.

(56) References Cited

U.S. PATENT DOCUMENTS 7,877,482 B1 * 1/2011 Ashcraft ............... G06F 9/5083 713/1
8,914,582 B1 * 12/2014 Trimble ................ G06F 12/123 711/136
9,116,181 B2 * 8/2015 Yu ......................... G06F 9/5094
9,148,454 B1 * 9/2015 Sharma ............... H04L 65/1066
9,166,897 B1 * 10/2015 Sharma ............... H04L 43/0817
9,229,785 B2 * 1/2016 Cai ........................ G06F 9/5088
9,591,582 B1 * 3/2017 Rabii .................... H04L 43/028
11,159,511 B1 * 10/2021 Geusz ................... H04L 63/102
11,394,770 B1 * 7/2022 Bello ...................... H04L 67/51
11,716,355 B1 * 8/2023 Maeng .................. H04L 63/105
2007/0067440 A1 * 3/2007 Bhogal ................... H04L 67/34 709/224
2008/0268828 A1 * 10/2008 Nagaraja ................. G06F 9/505 455/419
2011/0113007 A1 * 5/2011 Buckley ................ G06F 16/337 709/224
2012/0311570 A1 * 12/2012 Gandhi ................. G06F 9/5027 718/1

(Continued)

OTHER PUBLICATIONS

Y. Yang et al., "Context-Aware Task Offloading for Wearable Devices," 2017 26th International Conference on Computer Communication and Networks (ICCCN) (Year: 2017).*

*Primary Examiner* — Benjamin C Wu
(74) *Attorney, Agent, or Firm* — Schwegman Lundberg & Woessner, P.A.

(57) ABSTRACT

A computer implemented method includes monitoring resource utilization for multiple programs running on a user device. A current user interaction with the programs is detected and a usage contextual profile representing user interaction with the programs is derived. The monitored resource utilization is compared to a performance threshold and one of the multiple programs is distributed for execution elsewhere in response to the comparing to optimize user experience on the user device in accordance with the usage contextual profile.

18 Claims, 4 Drawing Sheets

(56) References Cited

U.S. PATENT DOCUMENTS

2013/0085886 A1* 4/2013 Satish .................... G06Q 30/02 705/26.7
2013/0173809 A1* 7/2013 Hueter ................ H04L 67/1004 709/226
2014/0143781 A1* 5/2014 Yao ....................... G06F 9/5016 718/100
2015/0261274 A1* 9/2015 Ahnn .................... G06F 1/3212 713/340
2015/0370428 A1* 12/2015 Chan ..................... G06F 3/0482 715/739
2015/0373107 A1* 12/2015 Chan ................... H04L 67/1095 709/205
2016/0098334 A1* 4/2016 Hariharakrishnan ........................ G06F 11/3466 702/186
2016/0316314 A1* 10/2016 Swaminathan ......... H04W 4/80
2016/0378570 A1* 12/2016 Ljubuncic ............. G06F 9/5027 718/104
2017/0109204 A1* 4/2017 Feng ..................... G06F 9/5083
2017/0351546 A1* 12/2017 Habak ..................... G06F 9/505
2018/0107489 A1* 4/2018 Gao .................... G06F 9/30174
2018/0262991 A1* 9/2018 Rao ................... H04W 52/0261
2020/0159648 A1* 5/2020 Ghare ................... G06F 9/4411
2020/0250008 A1* 8/2020 Cleave ................... H04H 20/74
2021/0105624 A1* 4/2021 Sardesai ................. H04W 4/50
2021/0191701 A1* 6/2021 Korzunov ............. G06F 11/302
2021/0192046 A1* 6/2021 Levin .................... G06F 9/4893
2022/0358025 A1* 11/2022 Dattatri ................. G06F 18/214
2022/0365791 A1* 11/2022 Blatz ................... G06F 9/44505
2022/0408333 A1* 12/2022 Ryu ...................... H04L 67/141
2023/0037219 A1* 2/2023 Zhang ................... G06F 3/0679
2023/0091753 A1* 3/2023 Kelly .................... G06F 9/5027 718/104
2023/0143232 A1* 5/2023 Balazs ................ H04L 43/0876 709/223
2024/0223644 A1* 7/2024 Rastogi ................... H04L 67/10
2024/0354160 A1* 10/2024 Sethi ..................... G06F 9/5011
2024/0362073 A1* 10/2024 Ramirez Flores ...... G06F 9/505
2025/0211575 A1* 6/2025 Kommula .............. G06N 5/022

* cited by examiner

| NAME | SCREEN TIME | 90% CPU | 88% MEMORY | 2% DISK | 0% NETWORK |
|---|---|---|---|---|---|
| PROGRAM 1 | | 40% | 601 mB | .2 mB/s | 0 mbps |
| • • • | | | | | |
| PROGRAM N | | .1% | .2 mB | 0.0 mB/s | 0 mbps |

LOAD MANAGEMENT SYSTEM FOR DEVICE TO OPTIMIZE USER EXPERIENCE

BACKGROUND

Many computer users multitask and open many computer programs without considering the physical resource limitations of their device. Resource-hogging programs can degrade user experience by slowing response times.

Closing unnecessary programs requires manual intervention and time to determine which programs can be closed without affecting user efficiency. Having to restart programs to switch tasks can take additional time and further reduce user efficiency.

SUMMARY

A computer implemented method includes monitoring resource utilization for multiple programs running on a user device. A current user interaction with the programs is detected and a usage contextual profile representing user interaction with the programs is derived. The monitored resource utilization is compared to a performance threshold and one of the multiple programs is distributed for execution elsewhere in response to the comparing to optimize user experience on the user device in accordance with the usage contextual profile.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Closing unnecessary programs, such as software apps or applications, to optimize device performance and user experience requires manual intervention and time to determine which programs can be closed without affecting user efficiency. Having to restart programs to switch tasks can take additional time and further reduce user efficiency. Adding additional computing resources to the device can take time and additional expense. Some devices may not support additional memory or processors. Offloading programs to cloud based resources can be expensive and result in further delays, especially if network performance is slow.

An improved load management system monitors resource utilization of a local user device and manages program execution location to optimize user experience. A compute usage contextual profile represents user interaction with programs and is used to prioritize resource utilization for selected programs to ensure user experience is optimized. Optimization of the user experience includes one or more of ensuring programs that the user is actively using are not slowed down by other programs that may be running the background or are of lower priority. Any redistribution of programs that results in faster operation or prevents slower operation of actively used programs is considered an optimization or enhancement of the user experience.

Figure 1:
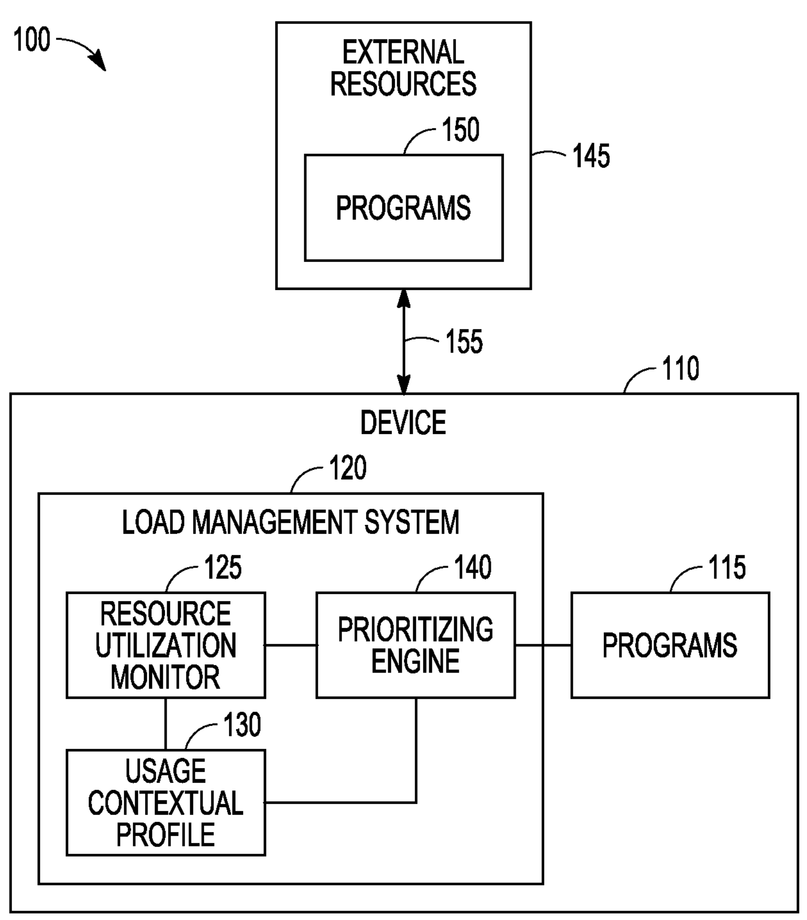
FIG. 1 is a block diagram of a system for optimizing user experience of a device by distributing program execution to other processing resources based on current user activity according to an example embodiment.

FIG. 1 is a block diagram of a system 100 for optimizing user experience of a device by distributing program execution to other processing resources based on current user activity. System 100 includes a user device 110, such as a laptop, personal computer, or other device that a user interacts with to perform various activities. Device 110 has limited processing capabilities, such as a limited amount of RAM and CPU resources for executing various computer programs 115 such as applications and apps, in addition to operating system programs.

Device 110 in one example includes a load management system 120. Load management system 120 includes a resource utilization monitor 125 that keeps track of computing resource utilization by the programs 115. Utilization data may be obtained from an operating system task manager. In one example, the resource utilization monitor 125 generates a list of programs in a z-order corresponding to a highest to lowest consumer of computing resources over a selected interval of time.

Load management system 120 may also include a usage contextual profile 130 that identifies a current type of utilization of the device 110 and programs executing on the device. The usage contextual profile tracks current programs that are being interacted with by the user. Such current programs should remain active to enable the user to continue interacting with the device 110 in an efficient manner without having to reopen programs.

Load management system 120 may also include a prioritizing engine 140 that is coupled to receive utilization information from the resource utilization monitor 125 and information from the usage contextual profile 135 to determine programs 115 that can be offloaded to external resources 145 for execution as shown at programs 150 via a network 155. Various mechanisms may be used to determine which programs to offload, including table driven lists of programs to offload based on identified usage contextual profile 130 type, or even machine learning models trained on information from prior data collected from multiple users regarding resource utilization and usage contextual profiles.

In various examples, high consuming programs not being currently used or associated with a current usage contextual profile may be offloaded to other computing resources, such as cloud resources in response to device random access memory (RAM) and central processing unit (CPU) resource utilization being above a threshold, such as 70% or 80% utilization for CPU resources and 60% for RAM. Such offloading lowers device resource utilization while programs may be executed close to the location of the relevant data.

In one example, one of multiple usage contextual profiles may include a content creator for a user that spends a significant amount of time on a content creation program, such as digital video, digital audio programs, presentation programs, spreadsheet programs, computer aided drafting applications, or rendering activities. Other programs may also be open to track notifications from messaging or email clients.

Figure 2:
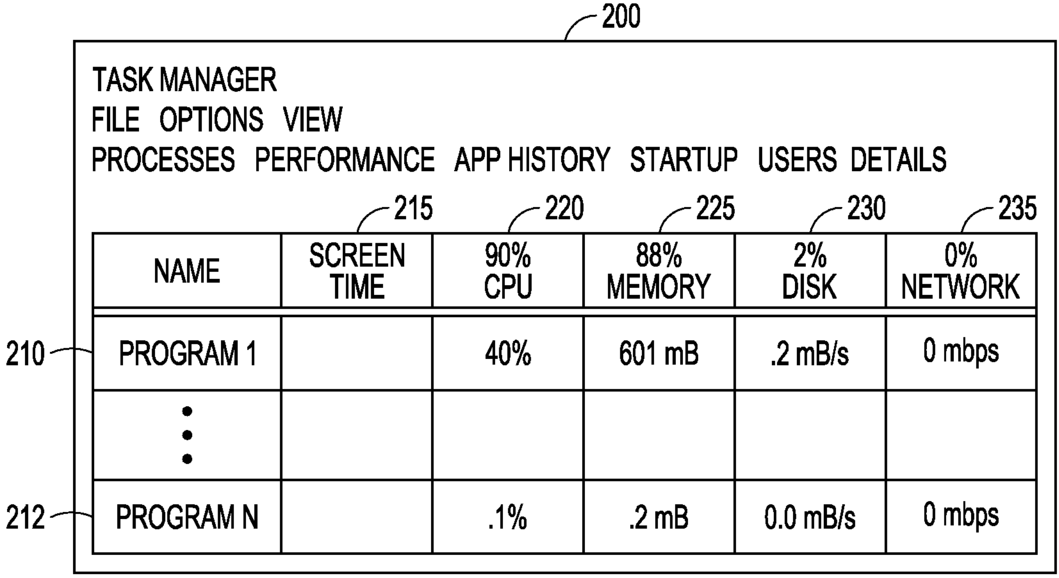
FIG. 2 is an example utilization list that includes utilization information for multiple currently active programs according to an example embodiment.

FIG. 2 is an example utilization list 200 that includes utilization information for multiple currently active programs on device 110. The utilization list 200, also referred to as a z-list, may be used to determine which programs may be offloaded to enhance user experience given the user's current usage contextual profile. The load management system 120 may track the programs 210, 212 that are open and consuming resources. N such programs are illustrated. List 200 provides resource consumption data that may include screen time displaying output from such programs in column 215, CPU utilization in column 220, memory or RAM utilization in column 225, disk utilization rate in column 230, and network utilization in column 235. The resource consumption data is also representative of user interactions with open programs.

Such tracking may be used to classify the user with a usage contextual profile 130 such as a content creator and ensure that one or several programs are executed in locations that optimize response times for such programs to optimize the user experience.

Other usage contextual profiles 130 may reflect users that are gaming, participating in a video conference, watching a movie, or other types of activities that may be affected by background programs that are running on the device and consuming device resources, which in addition to memory and processing, may include network bandwidth utilization. As users switch between programs, the usage contextual profile may adjust based on usage models as the user changing activities.

Usage data may be captured and used to retrain models as well as place current user usage into the appropriate usage contextual profile. Over time, the load management system 120 recognizes user and device patterns and proactively forecasts a correct usage contextual profile. Such forecasts may be used to proactively synchronize data before offloading or transferring applications to external resources 145 or any alternate computing resources.

In one example, the prioritizing engine 140 may be used to organize computing resources so that processing resources are close to relevant data to enhance the user experience. In one example, if data is stored on the device 110 or via a high-speed network as opposed to over a lower speed connection to cloud storage, the corresponding program accessing the data may be prioritized to execute on the device, or a server coupled to the device via the high-speed network 155.

Similarly, the device of a "content creator" usage contextual profile will result in prioritizing programs by level of importance to the task being performed by the user. A user with 20 application programs open may result in the consumption of over 90% of the CPU and RAM resources. The prioritizing engine may identify that 17 of the applications may be executed on external computing resources to improve the user experience for the top three applications related to content creation.

Alternatively, the prioritizing engine may determine that one of the top three applications may have better performance by executing in one or more external processing resources such as cloud resources located locally or via public network, or even a local server. In each example, the programs may be moved in accordance with the prioritizing engine decisions.

In one example, the load management system utilizes an artificial intelligence (AI) model that receives features related to user interaction comprising user selections associated with multiple programs via a device and determines a corresponding contextual usage profile for use in distributing background programs to computing resources on other devices. The user selections include mouse clicks for various functions such as navigation functions, data entry functions, game interactions, and other interactions which may vary from application to application, but are representative of user interaction with the programs.

The prioritizing engine 140 may gather continuous data sets from computer program usage captured by the resource utilization monitor 125. The data sets may be used to augment learning algorithms that recognize patterns and the selection of new usage patterns. In one example, a user my have the following programs loaded on their system: Adobe Illustrator After Effect, ANSYS, Auto CAD, 3ds MAX, and MAYA to name a few. If a user begins to run Auto CAD with more layers than the current system resources can handle, the system will become unresponsive, or sluggish. Before the system becomes unresponsive or sluggish and as the system resource utilization approaches a utilization threshold limit, the prioritizing engine 140 will off load programs that are not associated with the current usage contextual profile to ensure the device 110 remains usable and responsive. When demand drops, the prioritizing engine 140 may release external resources, such as cloud-based resources, resulting in the off loaded programs returning to the device 110.

In one example, the prioritizing engine 140 scores programs for deciding what programs to off load. In one example, the following aspects of a program are used to score the programs:

1. Program is a high consumer of CPU such as >70%.
2. Program is a high RAM consumer such as >60%.
3. Program is performing background computing such as rendering.
4. Program is higher in the z-order and user has higher performance expectations.
5. The prioritizing engine 140 learns a user's usage habits and how the work goes from task to task to help predict which programs, when launched, are likely to be used with the expectation of high performance.

Figure 3:
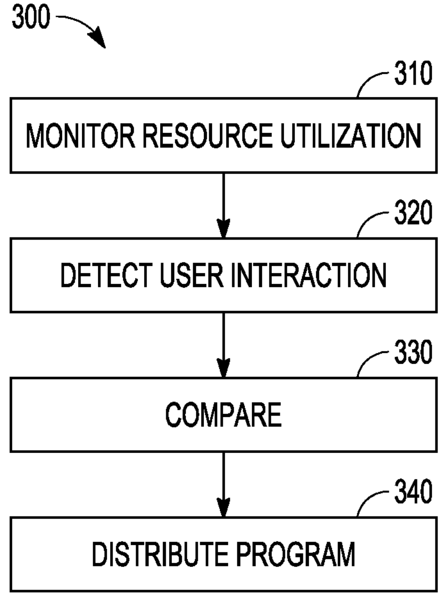
FIG. 3 is a flowchart of a computer implemented method of distributing programs to enhance user experience of a device according to an example embodiment.

FIG. 3 is a flowchart of a computer implemented method 300 of distributing programs to enhance user experience of a device. Method 300 begins at operation 310 by monitoring resource utilization for multiple programs running on a user device. Monitoring resource utilization at operation 310 includes tracking at least one of central processing unit (CPU) utilization or random access memory (RAM) utilization.

Current user interaction with the programs is detected at operation 320. A usage contextual profile representing user interaction with the programs is derived at operation 330. The derived usage contextual profile may be derived as a function of the most used program or programs.

The most used program is derived as one of the multiple programs having the highest central processing unit (CPU) utilization over a just ending selected time window. Operation 340 compares the monitored resource utilization to a performance threshold. The performance threshold may be a percentage of CPU utilization or RAM utilization in one example Operation 350 distributes one or more of the multiple programs for execution elsewhere in response to the comparing to optimize user experience on the user device in accordance with the usage contextual profile. Distributing one of the multiple programs includes selecting a background program that is not associated with the derived usage contextual profile having a utilization rate higher than other background programs. In one example, one of the multiple programs that is distributed is a background program that is most used.

In one example, a portion of the one of the multiple programs may be distributed. In a further example, more than one of the multiple programs may be distributed.

In a further example, the derived usage contextual profile is derived based on current usage features provided to a machine learning model trained to classify current usage as one of many usage contextual profiles. The machine learning model may be trained as a function of labeled sets of usage features derived from user interaction data comprising logged user interaction data comprising user selections associated with executing programs.

Figure 4:
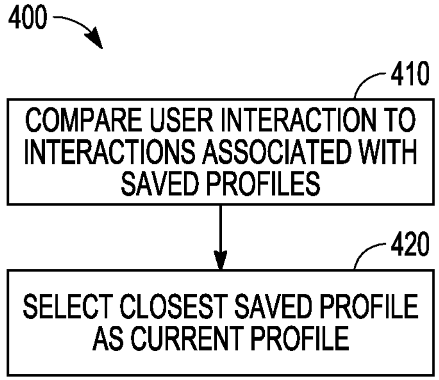
FIG. 4 is a flowchart of a computer implemented method illustrating deriving the usage contextual profile representing user interaction with the programs according to an example embodiment.

FIG. 4 is a flowchart of a computer implemented method 400 illustrating deriving the usage contextual profile representing user interaction with the programs. Method 400 begins at operation 410 by comparing the current user interactions with the programs to user interactions with programs associated with multiple saved usage contextual profiles. Operation 420 selects the saved usage contextual profile having user interactions with programs that is closest to the current user interactions with programs.

The following are some examples of user interactions that determine a current usage contextual profile and how program execution is distributed. In a first example, an Autocad usage pattern is proactively forecasted to time of day or to a program correlation usage pattern. The prioritizing engine 140 determines in one example that Autocad has an external compute cluster. The network conditions and data synchronization with local storage is also determined, along with resource capability that will be needed. A user profile to sign in to a service provided by the external compute cluster is used to set up the external compute cluster.

In a further example, a home compute device usage pattern for a smart TV rendering 4K video is encountered and the smart TV compute device determines that sending data to a more powerful device or cluster of devices would provide faster rendering and better user experience for the user.

Yet a further example includes a user having a low performance device that is consuming most computing resources from a browser program. When opening a resource intensive video game application, the browser or video game may be offloaded to run remotely provided a remote device or service is available.

Artificial intelligence (AI) is a field concerned with developing decision-making systems to perform cognitive tasks that have traditionally required a living actor, such as a person. Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection, but the ANN designer does not generally know which weights will work for a given application. Instead, a training process generally proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well known optimization algorithm for back propagation may be used, such as SGD, Adam, etc.

Figure 5:
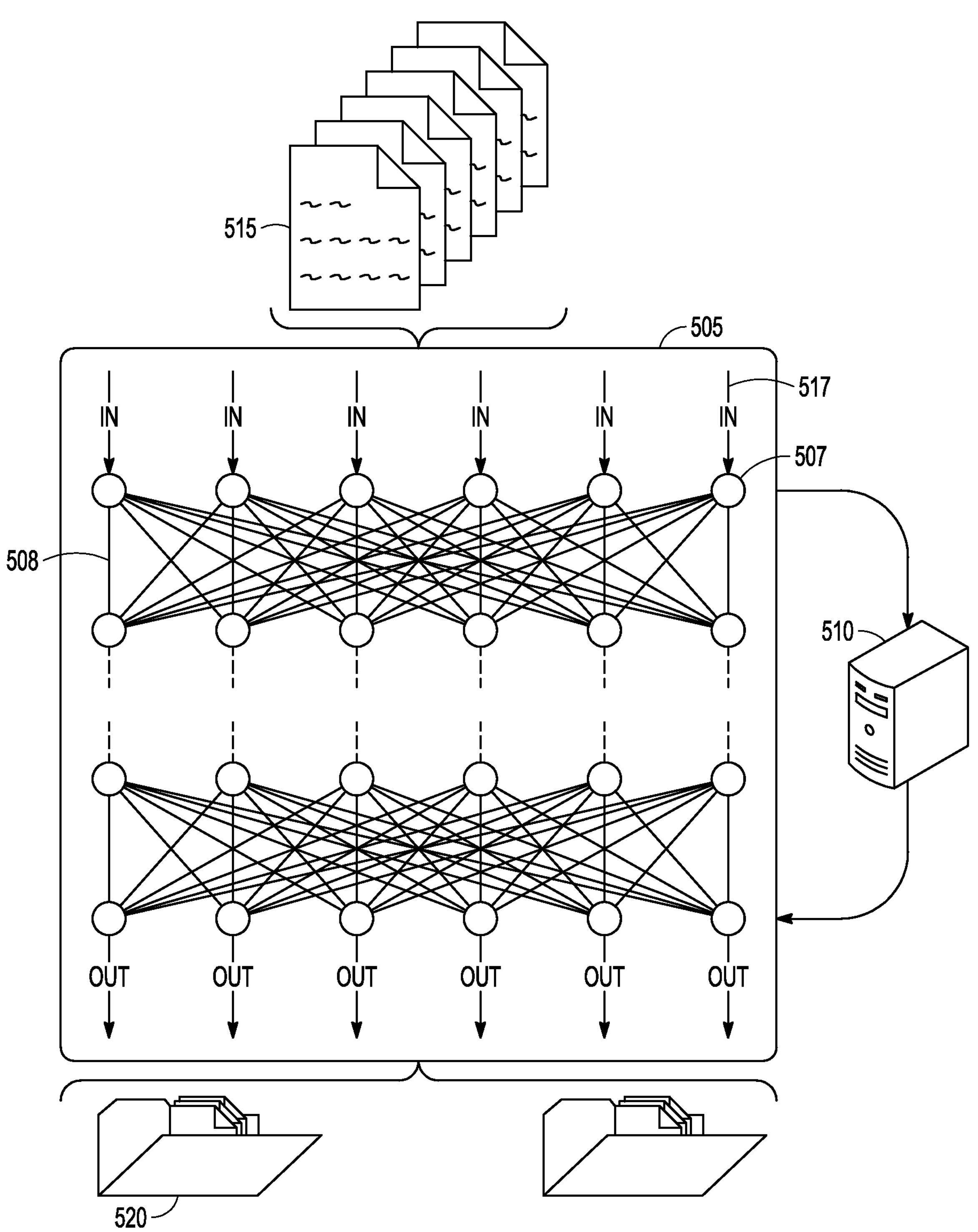
FIG. 5 is a block diagram of an example of an environment including a system for neural network model training according to an example embodiment.

FIG. 5 is a block diagram of an example of an environment including a system for neural network model training according to an embodiment. The system includes an ANN 505 that is trained using a processing node 510. ANN 505 may be implemented as a module and used in conjunction with the combined reward functions. Example modules include convolutional neural networks (CNN) and other types of networks such as ResNet, a type of network that uses residual functions, as well as any other type of network that may be adapted to utilize reward functions. Such neural networks may consist of one or more layers of neurons or synapses in various embodiments. The number of layers may depend on the type of network selected. ResNet may have 50 layers, for example, while other networks may have from a few to a thousand or more. Other CNN structures that may be used include but are not limited to VGG, Inception, and Exception.

The processing node 510 may be a CPU, GPU, field programmable gate array (FPGA), digital signal processor (DSP), application specific integrated circuit (ASIC), or other processing circuitry. In an example, multiple processing nodes may be employed to train different layers of the ANN 505, or even different nodes 507 within layers. Thus, a set of processing nodes 510 is arranged to perform the training of the ANN 505.

The set of processing nodes 510 is arranged to receive a training data set 515 for the ANN 505. The ANN 505 comprises a set of nodes 507 arranged in layers (illustrated as rows of nodes 507) and a set of inter-node weights 508 (e.g., parameters) between nodes in the set of nodes. In an example, the training data set 515 is a subset of a complete training set. Here, the subset may enable processing nodes with limited storage resources to participate in training the ANN 505.

The training data may include multiple numerical values representative of a domain, such as red, green, and blue pixel values and intensity values for an image or pitch and volume values at discrete times for speech recognition. Each value of the training, or input 517 to be classified once ANN 505 is trained, is provided to a corresponding node 507 in the first layer or input layer of ANN 505. The values propagate through the layers and are changed by the objective function.

As noted above, the set of processing nodes is arranged to train the neural network to create a trained neural network. Once trained, data input into the ANN will produce valid classifications 520 (e.g., the input data 517 will be assigned into categories), for example. The training performed by the set of processing nodes 507 is iterative. In an example, each iteration of the training the neural network is performed independently between layers of the ANN 505. Thus, two distinct layers may be processed in parallel by different members of the set of processing nodes. In an example, different layers of the ANN 505 are trained on different hardware.

ANN 505 may calculate one or more neuron or synapse weights 508 for criteria based upon one or more machine learning algorithms. During training, historical action information representing past actions of the robot may be labeled with an indication of whether the decision made was ultimately successful, in this case, the reward. Thus, the reward, which is based on both robot navigation and the ability to track the object, is used to update the network weights 508. Note that in various networks, initial weights may be pre-set. In other networks, initial weights may be randomized. In one embodiment, a module or processor executing computer instructions to effectuate the neural network learning operations modifies a source neuron's output with a synapse weight to determine the contribution of the source neuron to cause the sink neuron to fire. Practically, in this embodiment, a single and modified value is integrated at the sink neuron in response to the source neuron activation.

Figure 6:
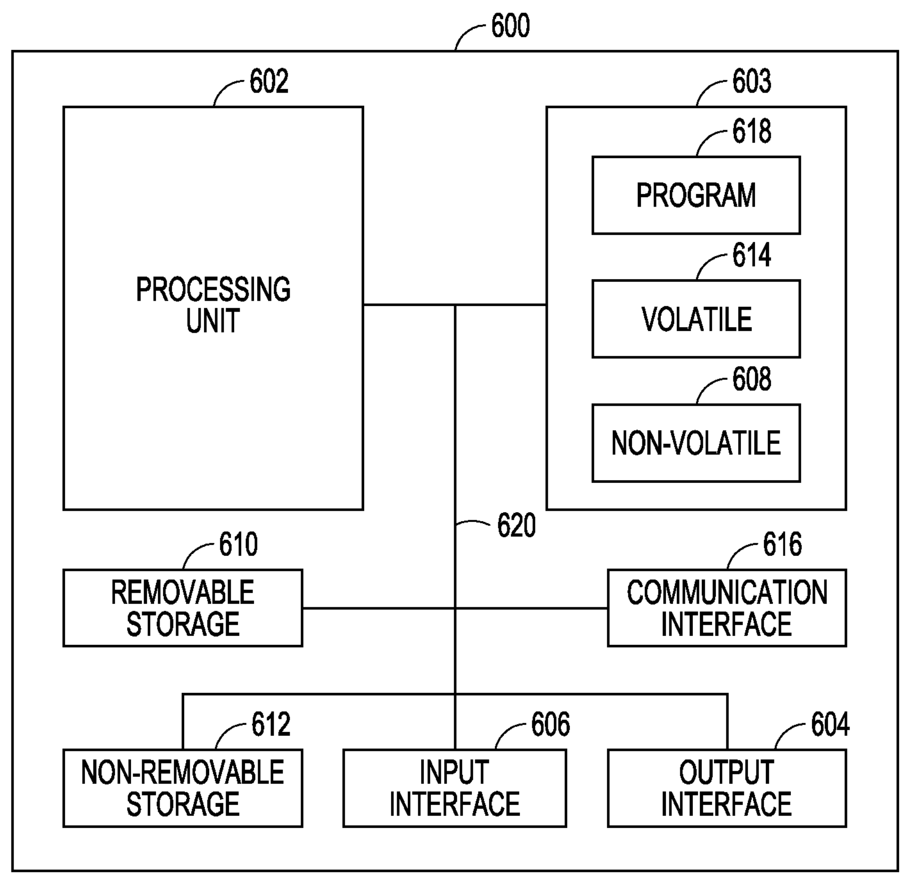
FIG. 6 is a block schematic diagram of a computer system to implement one or more example embodiments.

FIG. 6 is a block schematic diagram of a computer system 600 to . . . and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes monitoring resource utilization for multiple programs running on a user device. A current user interaction with the programs is detected and a usage contextual profile representing user interaction with the programs is derived. The monitored resource utilization is compared to a performance threshold and one of the multiple programs is distributed for execution elsewhere in response to the comparing to optimize user experience on the user device in accordance with the usage contextual profile.
2. The method of example 1 wherein monitoring resource utilization includes tracking at least one of central processing unit (CPU) utilization or random access memory (RAM) utilization.
3. The method of example 2 wherein the performance threshold is a percentage of CPU utilization.
4. The method of any of examples 1-3 wherein the derived usage contextual profile is derived as a function of most used program or programs.
5. The method of example 4 wherein the most used program is derived as one of the multiple programs having a highest central processing unit (CPU) utilization over a just ending selected time window.
6. The method of any of examples 4-5 wherein distributing one of the multiple programs includes selecting a background program that is not associated with the derived usage contextual profile having a utilization rate higher than other background programs.
7. The method of any of examples 4-6 wherein distributing one of the multiple programs includes selecting one of the most used programs.
8. The method of any of examples 1-7 wherein distributing one of the multiple programs includes distributing a portion of the one of the multiple programs.
9. The method of any of examples 1-8 wherein distributing one of the multiple programs includes distributing multiple of the multiple programs.
10. The method of any of examples 1-9 wherein deriving a usage contextual profile representing user interaction with the programs includes comparing the current user interactions with the programs to user interactions with programs associated with multiple saved usage contextual profiles and selecting the saved usage contextual profile having user interactions with programs that is closest to the current user interactions with programs.
11. The method of any of examples 1-10 wherein the derived usage contextual profile is derived based on current usage features provided to a machine learning model trained to classify current usage as one of many usage contextual profiles.
12. The method of example 11 wherein the machine learning model is trained as a function of labeled sets of usage features derived from user interaction data comprising logged user interaction data comprising user selections associated with executing programs.
13. A machine-readable storage device has instructions for execution by a processor of a machine to cause the processor to perform operations to perform any of the methods of examples 1-12.
14. A device includes a processor and a memory device coupled to the processor and having a program stored thereon for execution by the processor to perform operations to perform any of the methods of examples 1-12.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:

monitoring resource utilization for multiple programs running on a user device;

detecting current user interaction with the programs;

deriving a usage contextual profile representing user interaction with the programs, wherein the derived usage contextual profile is derived as a function of program or programs having a highest resource utilization;

comparing the monitored resource utilization to a performance threshold; and distributing one of the multiple programs for execution elsewhere in response to the comparing to optimize user experience on the user device in accordance with the usage contextual profile, wherein distributing one of the multiple programs includes selecting a background program that is not associated with the derived usage contextual profile having a utilization rate higher than other background programs.

2. The method of claim 1 wherein monitoring resource utilization includes tracking at least one of central processing unit (CPU) utilization or random access memory (RAM) utilization.

3. The method of claim 2 wherein the performance threshold is a percentage of CPU utilization.

4. The method of claim 1 wherein the program that is distributed the program having a highest central processing unit (CPU) utilization over a just ending selected time window.

5. The method of claim 1 wherein distributing one of the multiple programs includes selecting one of the programs having a highest resource utilization.

6. The method of claim 1 wherein distributing one of the multiple programs comprises distributing a portion of the one of the multiple programs.

7. The method of claim 1 wherein distributing one of the multiple programs comprises distributing multiple of the multiple programs.

8. The method of claim 1 wherein deriving a usage contextual profile representing user interaction with the programs comprises:

comparing the current user interactions with the programs to user interactions with programs associated with multiple saved usage contextual profiles; and selecting the saved usage contextual profile having user interactions with programs that is closest to the current user interactions with programs.

9. The method of claim 1 wherein the derived usage contextual profile is derived based on current usage features provided to a machine learning model trained to classify current usage as one of many usage contextual profiles.

10. The method of claim 9 wherein the machine learning model is trained as a function of labeled sets of usage features derived from user interaction data comprising logged user interaction data comprising user selections associated with executing programs.

11. A machine-readable storage device having instructions for execution by a processor of a machine to cause the processor to perform operations to perform a method, the operations comprising:

monitoring resource utilization for multiple programs running on a user device;

detecting current user interaction with the programs;

deriving a usage contextual profile representing user interaction with the programs, wherein the derived usage contextual profile is derived as a function of program or programs having a highest resource utilization;

comparing the monitored resource utilization to a performance threshold; and distributing one of the multiple programs for execution elsewhere in response to the comparing to optimize user experience on the user device in accordance with the usage contextual profile, wherein distributing one of the multiple programs includes selecting a background program that is not associated with the derived usage contextual profile having a utilization rate higher than other background programs.

12. The device of claim 11 wherein monitoring resource utilization includes tracking at least one of central processing unit (CPU) utilization or random access memory (RAM) utilization and wherein the performance threshold is a percentage of CPU utilization.

13. The device of claim 11 wherein the derived usage contextual profile is derived as a function of most used program or programs and wherein the most used program is derived as one of the multiple programs having a highest central processing unit (CPU) utilization over a just ending selected time window.

14. The device of claim 11 wherein deriving a usage contextual profile representing user interaction with the programs comprises:

comparing the current user interactions with the programs to user interactions with programs associated with multiple saved usage contextual profiles; and selecting the saved usage contextual profile having user interactions with programs that is closest to the current user interactions with programs.

15. The device of claim 11 wherein the derived usage contextual profile is derived based on current usage features provided to a machine learning model trained to classify current usage as one of many usage contextual profiles and wherein the machine learning model is trained as a function of labeled sets of usage features derived from user interaction data comprising logged user interaction data comprising user selections associated with executing programs.

16. A device comprising:

a processor; and a memory device coupled to the processor and having a program stored thereon for execution by the processor to perform operations comprising:

monitoring resource utilization for multiple programs running on a user device, detecting current user interaction with the programs;

deriving a usage contextual profile representing user interaction with the programs, wherein the derived usage contextual profile is derived as a function of program or programs having a highest resource utilization;

comparing the monitored resource utilization to a performance threshold; and distributing one of the multiple programs for execution elsewhere in response to the comparing to optimize user experience on the user device in accordance with the usage contextual profile, wherein distributing one of the multiple programs includes selecting a background program that is not associated with the derived usage contextual profile having a utilization rate higher than other background programs.

17. The device of claim 16 wherein monitoring resource utilization includes tracking at least one of central processing unit (CPU) utilization or random access memory (RAM) utilization and wherein the performance threshold is a percentage of CPU utilization.

18. The device of claim 16 wherein deriving a usage contextual profile representing user interaction with the programs comprises:

comparing the current user interactions with the programs to user interactions with programs associated with multiple saved usage contextual profiles; and selecting the saved usage contextual profile having user interactions with programs that is closest to the current user interactions with programs.

* * * * *